US006967936B1

(12) United States Patent  
Laroia et al.

(10) Patent No.: US 6,967,936 B1  
(45) Date of Patent: Nov. 22, 2005

(54) UPLINK TIMING SYNCHRONIZATION AND ACCESS CONTROL FOR A MULTI-ACCESS WIRELESS COMMUNICATION SYSTEM

(75) Inventors: Rajiv Laroia, Basking Ridge, NJ (US); Junyi Li, Matawan, NJ (US); Sundeep Rangan, Hoboken, NJ (US); Sathyadev Venkata Uppala, Scotch Plains, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/503,040

(22) Filed: Feb. 11, 2000

(51) Int. Cl.[7] .............................................. H04Q 7/00
(52) U.S. Cl. ...................... 370/329; 370/338; 370/345; 370/442; 370/508; 370/208
(58) Field of Search ................... 370/277–280, 370/282, 312, 324–330, 336–338, 345, 347, 370/350, 442, 503, 508, 509

(56) References Cited

U.S. PATENT DOCUMENTS

| | | | |
|---|---|---|---|
| 5,430,760 A | | 7/1995 | Dent |
| 5,726,981 A | * | 3/1998 | Ylitervo et al. ............. 370/333 |
| 5,883,888 A | * | 3/1999 | St-Pierre ..................... 370/331 |
| 5,909,436 A | * | 6/1999 | Engstrom et al. ........... 370/343 |
| 6,144,656 A | * | 11/2000 | Kinnunen et al. .......... 370/347 |
| 6,181,947 B1 | * | 1/2001 | Du et al. ..................... 455/509 |
| 6,223,040 B1 | * | 4/2001 | Dam ........................... 455/447 |
| 6,449,290 B1 | * | 9/2002 | Willars et al. ............... 370/507 |
| 6,477,151 B1 | * | 11/2002 | Oksala ........................ 370/314 |
| 6,493,539 B1 | * | 12/2002 | Falco et al. ................. 455/67.1 |
| 6,496,490 B1 | * | 12/2002 | Andrews et al. ............ 370/329 |

FOREIGN PATENT DOCUMENTS

| | | |
|---|---|---|
| EP | 0 760 564 A2 | 3/1997 |
| WO | WO 97/46041 | 12/1997 |

OTHER PUBLICATIONS

S. Gupta, "Phase-Locked Loops," Proceedings IEEE, vol. 63, pp. 291-306, Feb. 1975.
W. Lindsey and C. Chie, "A survey of digital phase-locked loops," Proceedings IEEE, vol. 69, pp. 410-432, 1981.
L. Franks, "Synchronization subsystems: analysis and design," Digital Communications, Satellite/Earth Station Engineering, K. Feher, ed.,, Prentice-Hall, Englewood Cliffs, NJ, pp. 294-325, 1981.
H. Meyr and G. Ascheid, "Synchronization in Digital Communications," New York, NY: Wiley Interscience, pp. 21-35, 1990.
J. Proakis, "Digital Communications," New York, NY: McGraw-Hill, 3rd ed., pp. 333-371, 1995.

(Continued)

*Primary Examiner*—Steven Nguyen
*Assistant Examiner*—Roberta Shand

(57) ABSTRACT

Improved timing synchronization and access control techniques for use in an orthogonal frequency division multiplexed (OFDM) wireless system or other type of wireless communication system. In accordance with the invention, an uplink synchronization and access control system is provided in which mobile stations transmit certain timing and access signals in dedicated intervals in an uplink stream. Access control is illustratively implemented as a two-stage process in which a given mobile first transmits a generic uplink access signal in one of the intervals. If this access is accepted, the base station transmits an access acknowledgment containing initial timing and power corrections, along with initial channel assignments on which the mobile can initiate a call set-up process. For re-synchronization, mobiles transmit timing synchronization signals in the dedicated timing and access intervals. The base station measures the arrival time of the signals, and sends back appropriate timing corrections. The invention thereby ensures that orthogonality between mobiles is maintained.

34 Claims, 2 Drawing Sheets

OTHER PUBLICATIONS

A.J. Viterbi, "CDMA: Principles of Spread-Spectrum Communication," New York, Addison Wesley, Appendix 3A, pp. 68-75, 1995.

A. V. Oppenheim and R. W. Schafer, Digital Signal Processing, Englewood Cliffs, NJ, Prentice Hall, pp. 238-269, 1975.

J. L. Brenner, "Application of Chebychev Polynomials to Antenna Design," in Topics in Polynomials of One and Several Variables and their Application, T. M. Rassias, H.M. Srinivastava and A. Yanashaukas, editors, World Scientific Publ., pp. 101-108, 1993.

* cited by examiner

UPLINK TIMING SYNCHRONIZATION AND ACCESS CONTROL FOR A MULTI-ACCESS WIRELESS COMMUNICATION SYSTEM

RELATED APPLICATION

The present invention is related to the invention described in U.S. patent application Ser. No. 09/503,041, filed concurrently herewith in the name of inventors R. Laroia et al. and entitled "Signal Construction, Detection and Estimation for Uplink Timing Synchronization and Access Control in a Multi-Access Wireless Communication System," which is incorporated by reference herein.

FIELD OF THE INVENTION

The present invention relates generally to wireless communication systems and more particularly to techniques for implementing uplink timing synchronization and access control in a multi-access wireless communication system.

BACKGROUND OF THE INVENTION

Orthogonal frequency division multiplexing (OFDM) has been recently proposed as a multi-access scheme for use in the next generation cellular wireless systems. A critical issue in the design of these systems is the requirement of strict timing synchronization and access control. Although timing synchronization and access control techniques have been extensively studied and many such techniques are known in the art, synchronization and access control in an OFDM multi-user environment presents a number of unique challenges not adequately addressed by conventional techniques.

For example, unlike other multi-user systems, mobiles in OFDM systems generally cannot be synchronized individually. Therefore, in order to maintain in-cell orthogonality and avoid intersymbol interference (ISI), OFDM transmission often requires that all signal paths from all mobiles arrive at a given base station synchronized to within a specified cyclic extension of the base station sampling period. Consequently, OFDM timing synchronization necessitates some form of coordination and feedback amongst the users in a cell.

Additionally, since OFDM synchronization errors must be absorbed into the above-noted cyclic extension, synchronization errors must be much smaller than the symbol period. However, this fractional symbol timing accuracy is difficult to obtain from regular OFDM data symbols. This is due to the fact that OFDM data symbols typically comprise linearly modulated discrete tones whose periods can be as large as the symbol period. Accurately estimating timing from such narrowband signals can be difficult.

A need therefore exists for improved timing synchronization and access control techniques for use in OFDM systems.

SUMMARY OF THE INVENTION

The invention provides improved timing synchronization and access control techniques particularly well suited for use in the uplink channel of an orthogonal frequency division multiplexing (OFDM) multi-access wireless system. In accordance with the invention, mobiles transmit certain timing and access signals in dedicated timing and access intervals. The timing and access intervals may occur regularly within an uplink data stream, and all uplink data transmission may be suspended during these intervals. The suspension of data transmission allows pre-specified, wideband timing and access signals to be used.

More particularly, the use of dedicated timing and access intervals in accordance with the invention allows timing synchronization and access control to be separated from data communications. This separation permits timing and access to use signaling which is different than that of data communication, and eliminates interference between these communications. For example, timing and access signals can be allocated wider bandwidths than data signals so that the mobile timing can be estimated more easily from the timing and access signals. Also, by using dedicated timing and access intervals, "new" mobiles, i.e., mobiles attempting an initial access to a given base station, which are generally not timing synchronized or power controlled, do not disrupt the data traffic during their access attempts.

In an illustrative embodiment, each base station in an OFDM wireless system synchronizes its downlink and uplink timing. The downlinks and uplinks of different base stations need not be synchronized. A mobile desiring uplink access with a given base station starts with an open-loop timing synchronization by synchronizing its transmission timing to the received downlink. This open-loop downlink synchronization automatically synchronizes the uplink to within the round-trip propagation delay between the base station and mobile.

After open-loop synchronization, the mobile can attempt to access an uplink channel and improve the uplink synchronization. For this purpose, the mobile selects one signal from a designated set of pre-specified access signals, and transmits the selected signal in any of the timing and access intervals. In each timing and access interval, the base station searches for the presence of one or more of the access signals. If the access signal is detected and the access is granted, the base station can transmit an acknowledgment in a reserved downlink channel. The acknowledgment may contain initial uplink and downlink channel assignments along with initial timing and power corrections. The mobile can then begin call initialization on the assigned channels.

An important feature of the invention is that the access signals may be made generic in the sense that neither the mobile nor the service being requested is identified in the access signal itself. All identification and call initialization is performed on assigned channels after the acknowledgment is granted. Advantageously, this two-stage procedure keeps transmission in a set of random-access, asynchronous timing and access intervals to a minimum. Additionally, using generic access signals in designated intervals reduces the search space for the base station.

After the initial channel acquisition and timing synchronization, mobiles continue to perform re-synchronization for the duration of their connection with the same base station. For re-synchronization, mobiles transmit pre-determined timing re-synchronization signals to the base station in the timing and access intervals. The base station measures the arrival time of the signal, and sends appropriate timing corrections to the mobile. The continual re-synchronization allows the mobiles to track clock drifts and changes in the propagation delay from the mobile to the base station.

In general, mobiles need not re-synchronize every timing and access interval. Consequently, only a limited number of mobiles need to be re-synchronized in each interval. Reducing the number of mobiles synchronized in each interval allows the mobiles to use timing signals with wider bandwidth, while also freeing up additional bandwidth for access signals.

DETAILED DESCRIPTION OF THE INVENTION

Figure 1:
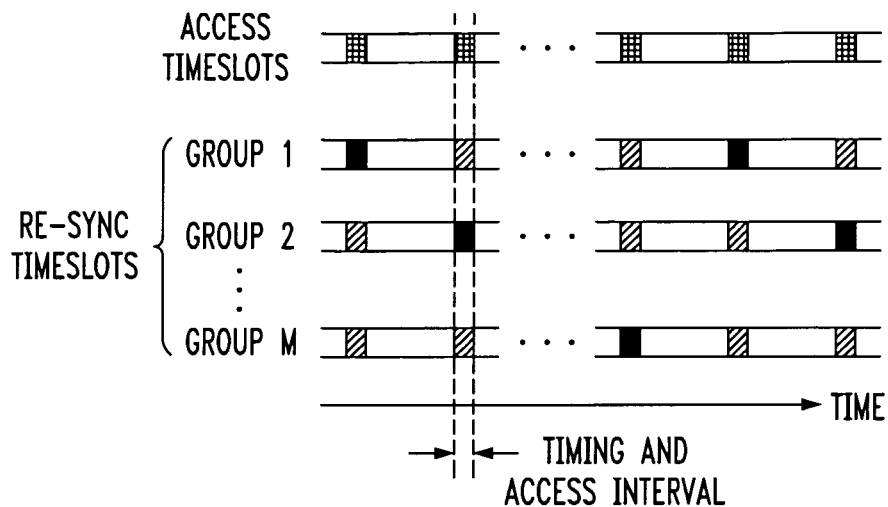
FIG. 1 shows an exemplary arrangement of timing and access intervals in an illustrative embodiment of the invention.

The present invention will be illustrated below in conjunction with an exemplary multiple access wireless communication system based on orthogonal frequency division multiplexing (OFDM). It should be understood, however, that the invention is not limited to use with any particular type of wireless communication system.

Signal construction, detection and estimation techniques suitable for use in conjunction with the present invention are described in the above-cited U.S. patent application Ser. No. 09/503,041.

Timing and Access Intervals

In accordance with the invention, mobiles transmit certain pre-specified, wideband timing and access signals in designated timing and access intervals. The timing and access intervals occur regularly within an uplink data stream, and all uplink data transmission is suspended during these intervals.

The timing and access intervals are dedicated in the sense that regular uplink data transmission is suspended in the intervals. The use of the dedicated intervals permits the data and timing to use different signaling, and prevents new mobiles that have not yet synchronized from interfering with synchronized data transmission.

The locations of the timing and access intervals within the uplink data stream should be known to all mobiles desiring uplink access or synchronization. For this purpose, the timing and access intervals can be placed at fixed, possibly periodic, locations in the uplink frames.

The frequency and size of the intervals represent basic design parameters. More frequent intervals permit a larger number of access attempts and a greater rate of re-synchronization. Larger intervals allow for longer access signals which can improve the detection and estimation accuracy. However, since there is no uplink data transmission during the timing and access intervals, the size and frequency of the intervals represent a direct overhead on the uplink data bandwidth.

A timing and access system using the above-noted dedicated intervals will be described in conjunction with the following three stages of a mobile's uplink communication: 1) initial open-loop synchronization; 2) access and initial uplink synchronization; and 3) uplink re-synchronization. Each of these uplink communication stages will be described in detail below.

Initial Open-Loop Synchronization

In open-loop synchronization, the mobile identifies a base station to communicate with, establishes downlink synchronization, and approximately synchronizes the uplink. In particular, after conducting the open-loop synchronization, the mobiles will be able to approximately locate the timing and access intervals.

A mobile desiring access begins by identifying if a carrier is available in its area, and if so, synchronizes its receiver to the downlink from an appropriate base station. In accordance with an illustrative embodiment of the invention, the mobile initially synchronizes its transmit timing to its receive timing. In addition, every base station in the illustrative embodiment synchronizes its uplink and downlink timing. There is no need in such a system for different base stations to synchronize their uplink or downlink with one another.

An important aspect of the initial open-loop synchronization is that, after the mobile has synchronized its transmit and receive timing to the base station downlink, the mobile uplink will be automatically initially synchronized to the base station uplink with an error of at most one round trip propagation delay. This open-loop synchronization accuracy is not intended to be sufficient for the data transmission. It is only intended to provide an approximate level of synchronization adequate to begin the access procedure. In particular, since the timing and access intervals occur at fixed points within the uplink stream, mobiles which have completed the open-loop synchronization will be able to locate the timing and access intervals within the round-trip propagation delay.

The particular procedure used for this initial downlink synchronization will not be described in detail herein. It is assumed in the illustrative embodiment that each base station constantly transmits some form of downlink pilot tones from which mobiles can acquire the carrier frequency, and the downlink symbol and frame timing. This downlink synchronization may be performed with standard phase lock loops and other devices in a conventional manner, e.g., using well-known techniques such as those described in S. Gupta, "Phase-Locked Loops," Proceedings IEEE, Vol. 63, pp. 291–306, February 1975; W. Lindsey and C. Chie, "A survey of digital phase-locked loops," Proceedings IEEE, Vol. 69, pp. 410–432, 1981; L. Franks, "Synchronization subsystems: analysis and design," Digital Communications, Satellite/Earth Station Engineering, K. Feher, ed., Prentice-Hall, Englewood Cliffs, N.J., 1981; H. Meyr and G. Ascheid, "Synchronization in Digital Communications," New York, N.Y.: Wiley Interscience, 1990; and J. Proakis, "Digital Communications," New York, N.Y.: McGraw-Hill, 3rd ed., 1995.

For the purpose of the open-loop synchronization, it is assumed that any mobile, after listening to the pilots, can select a base station, acquire the downlink timing from the base station, and tune its uplink transmitter timing to the downlink with no timing errors.

Note that downlink synchronization can be conducted without having mobiles transmit any data to the base station. Consequently, mobiles can maintain open-loop synchronization, even when the channel access is not immediately required, or after a channel use is completed. In this way, the open-loop re-synchronization does not need to be repeated in the case of multiple channel accesses. This will reduce the access latency for infrequently transmitting mobiles.

Access Control

After the initial open-loop synchronization, the mobile is ready to acquire and refine the synchronization of uplink and downlink channels. A mobile that wishes to acquire an uplink channel transmits one of a set of designated access signals during a timing and access interval. In each timing and access interval, the base station searches for the presence of one or more of the access signals. The detection of an access signal indicates an access attempt from some mobile.

After an access signal has been successfully detected, base station access control logic determines if the access can be granted. Also, the base station can estimate the arrival time and power of the received signal. From the arrival time, the base station can estimate the initial timing error of the mobile. This timing error will be error from the open-loop synchronization, which is the round-trip propagation delay between the mobile and base station.

If the access is detected and granted, the base station transmits an access acknowledgment back to the mobile in a reserved downlink channel. The location of the downlink channel for the acknowledgments should be known to the mobile. The access acknowledgment can also contain a timing and power correction, initial uplink and downlink channel assignments, and possibly other call set-up information. After receiving the access acknowledgment, the mobile can adjust its timing and power accordingly and begin communication on the assigned channels.

Due to insufficient power or channel fading, the access signal may not be detected. Also, even if detected, the base station may decide not to grant the access if resources are not available. If the access is denied or not detected, the base station can transmit a negative acknowledgment or simply not transmit any acknowledgment.

Access control logic and the general problem of scheduling resources are well-understood in the art and therefore will not be described in detail herein. However, accesses should not be granted if the base station believes the timing has not been sufficiently accurately estimated for the mobile to begin with proper timing synchronization. One way to determine whether the timing estimate is sufficiently accurate is to check that the received signal power of the access signal is sufficiently high.

Note that the access signals that the mobiles transmit are generic, in the sense that the mobile or the services being requested are not identified in the access signal itself. Mobiles conduct their identification, authentication and any other call set-up on the assigned channels after their timing and power have been corrected. This two-stage access guarantees that the mobiles perform the call initialization while synchronized on an assigned, non-random access channel, thereby reducing the resources and delays required for call initialization. Additionally, by using a set of generic signals in the timing and access intervals, the base station need only search a small set of signals in some particular intervals, thus simplifying the search procedure for random access.

It is possible that more than one mobile will use the same access signal in the same timing and access interval. To handle such cases, the base stations and mobiles can use a combination of collision detection and/or random backoff and random signal selection schemes. In collision detection, the base station searches for the presence of more than one of the same access signals in the same timing and access interval. In the event that a collision is detected, a negative acknowledgment or no acknowledgment can be transmitted on the broadcast channel. A specific collision alert signal can also be sent.

Mobiles that do not receive acknowledgments or receive negative acknowledgments, can re-attempt access in subsequent timing and access intervals. To reduce the probability of repeated collisions on subsequent attempts, each mobile can randomly select a new access signal from the designated access signal set. Additionally, in a manner similar to that of a conventional slotted ALOHA multi-access technique, the mobiles can exercise a random backoff between access attempts.

In addition to collisions, another reason that acknowledgments may not be transmitted may be because the access signal from the mobile has not been received with sufficient power. Mobiles should therefore increase their transmission power in the subsequent access attempts. However, in the case where mobiles receive a specific collision alert, the power increase may not be necessary.

In certain circumstances, collision detection may be difficult for the base station to perform. For example, if the delay spread is large, copies of the same signal sent by multiple mobiles can be confused with multipath copies from one mobile. When collisions occur and are not detected, more than one mobile may begin the second stage of access on the same assigned channel. To detect this error, the base station and mobiles can perform two possible tests.

First, the base station may perform an error-detection coding check on the data on the assigned uplink channel. If more than one mobile has used the same channel with similar power, the data on the uplink channel is likely to be corrupted and fail the check. In this case, the base station can transmit a signal directing all mobiles to drop the channels, and the mobiles can re-start the access procedure with appropriate random backoff and random signal selection described previously.

As an additional check, mobiles can transmit a unique identification in the call initialization on the assigned uplink channel, and the base station can re-transmit the received identification back to the mobile in the downlink. A mobile can thereby confirm that it is the intended user of the assigned channels. If more than one mobile uses the channel, but one is received with much higher power, the base station will receive and feedback only the dominant mobile's identification. In this way, the non-dominant mobiles will not receive their identification and will drop off the channel and re-start the access procedure with appropriate random backoff and random signal selection as described previously.

Re-Synchronization

After acquiring initial channels and timing, mobiles will need to continually re-synchronize to track changes in the propagation delay and timing drifts between the mobile and the base station. For re-synchronization, a mobile can transmit a pre-determined timing re-synchronization signal to the base station in a pre-determined timing and access interval. The base station can measure the arrival time of the signal, and communicate an appropriate timing correction back to the mobile in a downlink channel.

Re-synchronization may use a subset of the timing and access intervals, which is separate from those used for initial timing synchronization and access control. Alternatively, re-synchronization and initial access control may use the same timing and access intervals but with different sets of signals.

The frequency of re-synchronization need only be sufficient to cover the maximum possible clock drift and change in round-trip propagation delay. Consequently, all mobiles will not need to re-synchronize in every timing and access interval. By re-synchronizing only a small number of mobiles in each timing and access interval, each mobile that does re-synchronize is free to use a larger bandwidth signal for more accurate timing estimation. In addition, the reduced number of mobiles re-synchronizing in the timing and access interval frees bandwidth for access signals, if re-synchronization and initial access control use the same timing and access intervals.

Each mobile's re-synchronization schedule, i.e., assignment of timing re-synchronization signals and timing and access intervals, can be determined in the call initialization. Moreover, the base station can also explicitly request a re-synchronization from the mobile if necessary. In this case, the base station sends to the mobile a re-synchronization request in the downlink, along with the assignment of a timing and access interval and a re-synchronization signal for the mobile to carry out re-synchronization.

FIG. 1 illustrates an example of a simple re-synchronization schedule in which the timing and access intervals for the mobile's re-synchronization recur periodically. Every mobile, when entering the system, is assigned to one of M groups. In each timing interval, a particular one of the M groups of mobiles is synchronized (as indicated by the solid black timing slots), while the other M-1 groups suspend their transmission (as indicated by the shaded timing slots). The groups to be synchronized may be selected, e.g., in a round robin manner, i.e., group 1 is synchronized in timing interval 1, group 2 in interval 2, etc., with the synchronization cycle repeating every M timing intervals. Numerous other resynchronization schedules may be used in conjunction with the present invention, and will be apparent to those skilled in the art.

Base Station and Mobile Implementation

Examples of particular arrangements of processing elements suitable for implementing the above-described illustrative embodiment of the invention will now be described with reference to FIGS. 2 and 3. It should be understood that these are examples only, and many other arrangements could be used.

Figure 2:
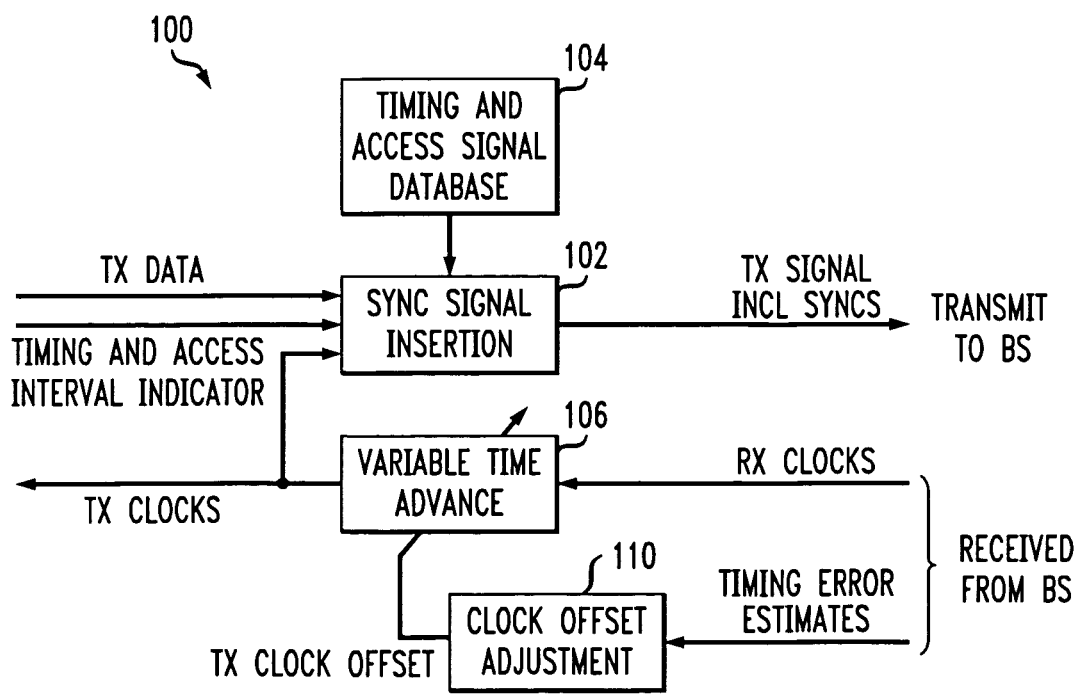
FIG. 2 shows a mobile uplink access and synchronization system in accordance with the invention.

FIG. 2 shows a mobile uplink access and synchronization system 100. The system 100 resides in a mobile, and is responsible for channel acquisition and timing synchronization signaling for that mobile. The system 100 also adjusts the uplink symbol clock based on timing offset measurements from a base station. The system 100 comprises a sync signal insertion unit 102, a timing and access signal database 104, a variable time advance unit 106, and a clock offset adjustment unit 110.

The sync signal insertion unit 102 inserts the timing and access signals into the transmit (TX) data stream. The location of the intervals is indicated by the timing and access interval indicator, which is assumed in this example to be derived from the downlink timing. The timing and access signals are stored in the timing and access signal database 104.

The mobile's uplink timing is derived in the variable time advance unit 106 and clock offset adjustment unit 110. The receive (RX) symbol clock is an input to the variable time advance unit 106, and is derived from the base station downlink. The variable timing offset advance unit 106 generates the TX clock by advancing the RX clock by a variable time offset. The TX clock has the same frequency as the RX clock, but is offset in time to insure that the mobile's data arrives at the base station at the desired time.

The clock offset adjustment unit 110 selects the timing offset based on the timing error estimates received from the base station. The clock offset adjustment circuit 110 may attempt to filter spurious error estimates due to poor estimation at the base station, or corruption of the feedback signal.

To acquire an uplink channel, a mobile transmits an access signal in any timing and access interval, using the sync signal insertion unit 102. The timing and access intervals in this example occur periodically at times which can be determined from the downlink frame and symbol timing. In each acquisition attempt, the access signal is randomly selected from one of a group of signals which are common to all mobiles and known by all base stations. The access signal set is stored in the timing and access signal database 104. Each base station scans the timing and access intervals for access signals to determine if any mobile sent an access request for an uplink channel.

If an access is detected and the access granted, the base station transmits an access acknowledgment in a reserved signaling channel in the downlink along with an uplink channel assignment, an initial timing and power correction, and any other call set-up information. After a mobile is granted an uplink channel, and continually during its use of the channel, the mobile periodically transmits certain timing synchronization signals to the base station. The timing synchronization signals are inserted by the sync signal insertion unit 102 into the TX data stream in the designated timing and access intervals. Each mobile connected to the base station is assigned a unique timing signal and timing interval in which it transmits. The signal and interval assignment can be given by the base station to the mobile during the call set-up.

The base station estimates the arrival time of the timing synchronization signal to determine the timing error between the desired and actual arrival time of the mobile's transmission. The estimated timing error is communicated back to the clock offset adjustment unit 110 of the mobile via the downlink. The clock offset adjustment unit 110 adjusts the timing offset by the timing error estimate. The TX clock is advanced from the RX symbol clock by the timing offset in variable time advance unit 106 to insure that the mobile's data arrives at the base station at the desired time. The clock offset adjustment unit 110 may also attempt to filter out spurious timing error estimates due to poor estimation at the base station, or corruption of the feedback signal.

Figure 3:
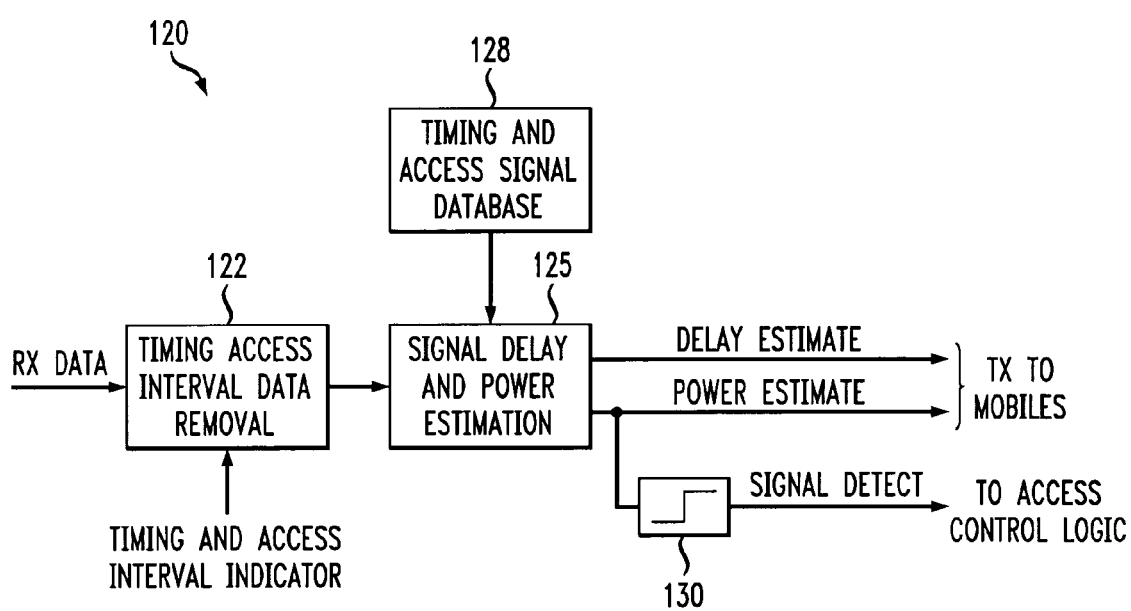
FIG. 3 shows a base station uplink access and synchronization system in accordance with the invention.

FIG. 3 shows a base station uplink access and synchronization system 120. The base station system 120 resides in each base station of the wireless system and is responsible for detecting access requests and estimating the timing offset from synchronization signal. The data from the timing and access intervals is first removed from the RX data stream in a timing access interval data removal unit 122. A signal delay and power estimation unit 125 scans the data in each interval for the presence of access signals. The access signals to search for can be pre-stored in a timing and access signal database 128. The presence of an access signal indicates an uplink access request from a mobile, and the detection of an access request in detection element 130 can be forwarded to the base station access control logic as shown.

The access and synchronization system 120 also estimates the arrival time of each timing synchronization signal. As with the access signals, the timing signals can also be pre-stored in the database 128. The timing synchronization signals' arrival time estimates are used to determine the error between the desired and actual arrival time of the mobile's transmission. A delay estimate and a power estimate from signal delay and power estimation unit 125 are transmitted to the mobiles. The assignments of the timing signals to the mobiles may be stored in a database which is updated by the access control logic. Information from such a database may be used to ensure that the measured timing errors can be sent back to the correct mobiles in the downlink.

The above-described embodiment is illustrative only. Alternative embodiments may be implemented, e.g., with a form of collision detection suitable for handling data traffic. In addition, the assumptions made above with regard to the analysis of the illustrative embodiment are for purposes of simplicity and clarity of illustration, and are not intended to limit the scope of the invention. The invention can of course be implemented in systems in which these assumptions do not apply. Furthermore, many different types, arrangements and configurations of processing elements other than those described herein may be used to implement the invention. These and other alternative embodiments within the scope of the appended claims will be readily apparent to those skilled in the art.

What is claimed is:

1. A method of uplink communication between a mobile station and a base station of a wireless communication system, the method comprising the step of:
transmitting at least one of an uplink access signal and an uplink timing synchronization signal from the mobile station to the base station in a particular one of a set of recurring intervals in which regular uplink data transmission from at least one additional mobile station to the base station is at least partially suspended.

2. The method of claim 1 wherein the wireless system comprises an orthogonal frequency division multiplexed (OFDM) system.

3. The method of claim 1 wherein the set of periodically recurring intervals comprise a set of time slots that are synchronized to a downlink established between the base station and the mobile station.

4. The method of claim 1 wherein the base station in response to a generic uplink access signal assigns an uplink channel to the mobile station and subsequently transmits power control and synchronization information to the mobile station, such that the mobile station initiates a call set-up process over the assigned uplink channel.

5. The method of claim 1 wherein uplink synchronization is conducted on a group-by-group basis in which each of a plurality of mobile stations is assigned to one of M groups, and in each of at least a subset of the intervals, each of the mobile stations in a particular one of the M groups of mobile stations transmits an uplink timing synchronization signal, while each of the mobile stations in the other M-1 groups suspends uplink transmission, and wherein the uplink synchronization cycle repeats every M intervals.

6. The method of claim 1 wherein a least a subset of a plurality of mobile stations adjust their uplink transmission times such that they are received synchronized at the base station.

7. The method of claim 1 wherein downlink and uplink timing are synchronized at the base station, and the mobile station initially synchronizes to the base station downlink, such that the mobile station is initially synchronized with a timing error of at most one round-trip propagation delay.

8. The method of claim 7 wherein the mobile station obtains the initial synchronization prior to acquiring an uplink channel, and remains synchronized in this manner even when access is not immediately required.

9. The method of claim 1 wherein in order to gain access, the mobile station transmits, in a timing and access interval, one of a set of designated access signals which are common for and known to all mobile stations attempting access to the base station.

10. The method of claim 1 wherein in each of a plurality of timing and access intervals, the base station searches for the presence of a transmitted access signal to determine if a mobile station is attempting access, and after detecting an access, utilizes control logic to determine whether the access can be granted.

11. The method of claim 1 wherein in response to a successfully detected access signal, the base station is configured to broadcast an acknowledgment or a negative acknowledgment in a downlink channel known to each of a plurality of mobile stations, wherein the acknowledgment contains an uplink and/or downlink channel assignment for the mobile station to initiate a call set-up process.

12. The method of claim 1 wherein the base station is operative to estimate the received signal power and arrival time of an access signal of the mobile station, such that if the access is granted, the base station can send initial power and timing correction information in the access acknowledgment.

13. The method of claim 1 wherein access can be denied if the access signal was not received with sufficient power to ensure that the timing estimation has a desired level of accuracy.

14. The method of claim 1 wherein the mobile station is operative to perform identification, authentication and call set-up process initiation operations on assigned uplink and downlink channels after power levels and timing have been corrected via interaction with the base station.

15. The method of claim 1 wherein the base station performs a collision detection operation in order to detect a situation in which more than one mobile station has transmitted the same access signal in the same timing and access interval, and further wherein if a collision is detected, the access can be denied, and the base station broadcasts a specific collision alert signal on a downlink channel known to a plurality of mobile stations.

16. The method of claim 1 wherein in response to a negative acknowledgment or the lack of an acknowledgment the mobile station is operative to retransmit an access signal in a later timing and access interval.

17. The method of claim 1 wherein in order to reduce the probability of repeated collisions, each of a plurality of mobile stations are operative to select subsequent access signals from an access signal set in a manner which is independent of previous access signals selected by a particular mobile station.

18. The method of claim 1 wherein a plurality of mobile stations are operative to utilize a random back-off procedure to determine the time between subsequent access attempts, and to transmit subsequent access signals at a higher power in the event of a failure of a previous access attempt.

19. The method of claim 15 wherein when collision detection is not performed, or when the detection is not fully reliable, the base station is operative to perform a reliability test on data associated with the assigned channels to determine if more than one mobile station has attempted to use the channel.

20. The method of claim 1 wherein the mobile station is operative to send a unique identification as part of a call set-up process, and the base station is operative to re-transmit the unique identification back to the mobile station in a downlink so that the mobile station can confirm that it is the intended user of the channel.

21. The method of claim 1 wherein in order to track drifts in timing and to improve initial synchronization, the mobile station is operative to continually re-synchronize throughout a period for which it is connected to the base station.

22. The method of claim 1 wherein the mobile station is operative to re-synchronize by transmitting a pre-determined timing re-synchronization signal in a designated timing and access interval, and further wherein the base station is operative to measure the arrival time of the signal, and deliver an appropriate timing correction back to the mobile station in a downlink.

23. The method of claim 1 wherein in each of a plurality of timing and access intervals, only a designated subset of a set of mobile stations connected to the base station transmit re-synchronization signals, so as to permit the mobile stations to use wider band signals for re-synchronization than would otherwise be possible, and to free up additional bandwidth for the access signals.

24. The method of claim 1 wherein the mobile station is assigned a re-synchronization schedule comprising a sequence of intervals and re-synchronization signals to use during a call set-up process, and further wherein the re-synchronization schedule ensures that timing re-synchronization is sufficiently frequent to cover a maximum clock drift and change in round-trip propagation delay between successive re-synchronizations.

25. The method of claim 1 wherein the base station is operative to request an additional re-synchronization for a particular mobile station if the base station determines that such a re-synchronization is required.

26. An apparatus for uplink communication between a mobile station and a base station of a wireless communication system, the apparatus comprising:
means for generating at least one of an uplink access signal and an uplink timing synchronization signal; and
means for transmitting the generated at least one signal from the mobile station to the base station in a particular one of a set of recurring intervals in which regular uplink data transmission from at least one additional mobile station to the base station is at least partially suspended.

27. An apparatus for use in a wireless communication system, the apparatus comprising:
a mobile station uplink access and synchronization system operative to transmit at least one of an uplink access signal and an uplink timing synchronization signal to a base station of the system in a particular one of a set of recurring intervals in which regular uplink data transmission from at least one additional mobile station to the base station is at least partially suspended.

28. A method of uplink communication between a mobile station and a base station of a wireless communication system, the method comprising the step of:
receiving in the base station at least one of an uplink access signal and an uplink timing synchronization signal transmitted from the mobile station in a particular one of a set of recurring intervals in which regular uplink data transmission from at least one additional mobile station to the base station is at least partially suspended.

29. An apparatus for uplink communication between a mobile station and a base station of a wireless communication system, the apparatus comprising:
means for receiving in the base station at least one of an uplink access signal and an uplink timing synchronization signal transmitted from the mobile station in a particular one of a set of recurring intervals in which regular uplink data transmission from at least one additional mobile station to the base station is at least partially suspended; and
means for processing the received at least one signal.

30. An apparatus for use in a wireless communication system, the apparatus comprising:
a base station uplink access and synchronization system operative to receive at least one of an uplink access signal and an uplink timing synchronization signal transmitted from a mobile station of the system in a particular one of a set of recurring intervals in which regular uplink data transmission from at least one additional mobile station to the base station is at least partially suspended.

31. A method of uplink communication between a mobile station and a base station of a wireless communication system, the method comprising the step of:
transmitting an uplink access signal from the mobile station to the base station in a particular one of a set of recurring intervals in which regular uplink data transmission from at least one additional mobile station to the base station is at least partially suspended.

32. A method of uplink communication between a mobile station and a base station of a wireless communication system, the method comprising the step of:
transmitting an uplink timing synchronization signal from the mobile station to the base station in a particular one of a set of recurring intervals in which regular uplink data transmission from at least one additional mobile station to the base station is at least partially suspended.

33. A method of uplink communication between a mobile station and a base station of a wireless communication system, the method comprising the step of:
receiving in the base station an uplink access signal transmitted from the mobile station in a particular one of a set of recurring intervals in which regular uplink data transmission from at least one additional mobile station to the base station is at least partially suspended.

34. A method of uplink communication between a mobile station and a base station of a wireless communication system, the method comprising the step of:
receiving in the base station an uplink timing synchronization signal transmitted from the mobile station in a particular one of a set of recurring intervals in which regular uplink data transmission from at least one additional mobile station to the base station is at least partially suspended.

* * * * *

UNITED STATES PATENT AND TRADEMARK OFFICE
CERTIFICATE OF CORRECTION

PATENT NO. : 6,967,936 B1
DATED : November 22, 2005
INVENTOR(S) : Rajiv Laroia et al.

It is certified that error appears in the above-identified patent and that said Letters Patent is hereby corrected as shown below:

Title page,
Item [56], References Cited, OTHER PUBLICATIONS, add the following:
-- M. Wahlqvist et al., "Time Synchronization in the Uplink of an OFDM System," IEEE, pp. 1569-1573, 1996 --.

Column 9,
Line 53, delete "a" after "wherein", and insert -- at --.

Signed and Sealed this

Twenty-fourth Day of January, 2006

JON W. DUDAS
*Director of the United States Patent and Trademark Office*